(12) United States Patent
Han (10) Patent No.: US 9,770,945 B2
(45) Date of Patent: Sep. 26, 2017

(54) CART CASTER CAPABLE OF CONVERTING INTO FIXED OR SWIVEL TYPE ACCORDING TO TRAVEL DIRECTION

(71) Applicant: Chae Jin Han, Busan (KR)

(72) Inventor: Chae Jin Han, Busan (KR)

( * ) Notice: Subject to any disclaimer, the term of this patent is extended or adjusted under 35 U.S.C. 154(b) by 56 days.

(21) Appl. No.: 14/894,498

(22) PCT Filed: Jul. 26, 2013

(86) PCT No.: PCT/KR2013/006701
§ 371 (c)(1),
(2) Date: Dec. 7, 2015

(87) PCT Pub. No.: WO2014/204044
PCT Pub. Date: Dec. 24, 2014

(65) Prior Publication Data
US 2016/0121652 A1    May 5, 2016

(30) Foreign Application Priority Data
Jun. 21, 2013    (KR) .................. 10-2013-0071683

(51) Int. Cl.
*B60B 33/02*    (2006.01)
*B60B 33/00*    (2006.01)

(52) U.S. Cl.
CPC ........ *B60B 33/028* (2013.01); *B60B 33/0084* (2013.01); *B60B 33/025* (2013.01);
(Continued)

(58) Field of Classification Search
CPC ..... B60B 33/028; B60B 33/02; B60B 33/023; B60B 33/025; B60B 33/00; B60B 33/006;
(Continued)

(56) References Cited

U.S. PATENT DOCUMENTS 3,636,586 A * 1/1972 Bollinger ............... B60B 33/02
16/35 R
4,248,445 A    2/1981 Vassar
(Continued)

FOREIGN PATENT DOCUMENTS

JP    S57-033003 A    2/1982
JP    2001-0213325 A    8/2001
(Continued)

*Primary Examiner* — Jeffrey O Brien
(74) *Attorney, Agent, or Firm* — KORUS Patent, LLC; Seong Il Jeong (57) ABSTRACT

The present invention relates to a cart caster that is installed on each of the edges of a bottom surface of a manned and unmanned cart to carry a product through a rolling motion, and more particularly, to a cart caster that is automatically converted into a fixed or rotating caster according to a forward/backward traveling direction of a cart to ensure safe travel and thereby easily carry a product and improve work conditions. According to the present invention, since the cart caster is automatically converted into a fixed or rotating caster by an operation of a swiveling conversion unit including an auxiliary wheel that is closely contacted to a wheel according to the forward/backward movement of the cart so as to rotate in only one direction and a fixing pin inserted into a coupling hole of a fixing plate, safe travel may be ensured in order to easily carry a product and improve work conditions.

2 Claims, 7 Drawing Sheets

(52) U.S. Cl.
CPC ....... *B60B 33/0039* (2013.01); *B60B 33/0049* (2013.01); *B60B 33/0057* (2013.01); *B60B 33/0068* (2013.01); *B60B 33/0073* (2013.01); *B60B 2900/3312* (2013.01); *B60B 2900/531* (2013.01); *Y10T 16/195* (2015.01)

(58) Field of Classification Search
CPC ............ B60B 33/0065; B60B 33/0068; B60B 33/0076
USPC .......................... 16/18 R, 19, 20, 35 R, 35 D
See application file for complete search history.

(56) References Cited

U.S. PATENT DOCUMENTS

| | | | | |
|---|---|---|---|---|
| 4,684,148 A | * | 8/1987 | Glaser | B60B 33/0042 16/35 R |
| 5,040,265 A | * | 8/1991 | France | B60B 33/028 16/35 R |
| 5,263,226 A | * | 11/1993 | Roy | B60B 33/021 16/20 |
| 5,517,718 A | * | 5/1996 | Eichhorn | B60B 33/028 16/18 R |
| 5,735,367 A | * | 4/1998 | Brubaker | B60B 33/021 188/1.12 |
| 5,984,333 A | * | 11/1999 | Constantijn | A61G 5/10 16/18 A |
| 8,079,606 B2 | * | 12/2011 | Dull | B60B 33/0005 16/35 R |
| 2007/0089265 A1 | | 4/2007 | Lin | |
| 2016/0339741 A1 | * | 11/2016 | Redington | B60B 33/006 |

FOREIGN PATENT DOCUMENTS

| | | |
|---|---|---|
| JP | 2010-036783 A | 2/2010 |
| KR | 10-0141040 B1 | 3/1998 |
| KR | 10-2010-0045322 A | 5/2010 |
| KR | 10-0961734 B1 | 6/2010 |
| KR | 10-0993524 B1 | 11/2010 |
| WO | 96-09937 A1 | 4/1996 |

* cited by examiner

CART CASTER CAPABLE OF CONVERTING INTO FIXED OR SWIVEL TYPE ACCORDING TO TRAVEL DIRECTION

BACKGROUND

(a) Technical Field

The present invention relates to a cart caster that is installed on each of the edges of a bottom surface of a manned and unmanned cart to carry a product through a rolling motion, and more particularly, to a cart caster that is automatically converted into a fixed or rotating caster according to a forward/backward traveling direction of a cart to ensure safe travel and thereby easily carry a product and improve work conditions.

(b) Background Art

In general, the cart caster is installed on each of the edges of a bottom surface of a manned and unmanned cart to carry a heavy product to a destination through a rolling motion. Conventionally, the caster is installed at the bottom surface so that an operator directly push the cart to transport. Recently a power cart having an electric power means to transport and an unmanned cart automatically transporting along rails installed at the floor are used.

Along with the development of the cart, the caster that is installed at the bottom surface of the cart has also been continuously developed. For example, a fixed type caster which enables the cart to move forward/backward only by simple rolling motion by being attached to the bottom surface of the cart was used in the past, a rotary caster which makes the change of the direction of the cart easy is used recently. In case of the caster configuration mounted with four casters consisted of two fore wheels and two rear wheels, the swivel type is used for the fore wheel and the fixed type is used for the rear wheel for easy change of the direction and safe travel. If the rotary casters are used for both of the fore wheel and the rear wheel, the caster may deviate from the right passage or the product may be dropped because a severe shaking may occur while rolling the cart. Thus, such caster combination is not used except special cases.

In addition, if the swivel type is used for the caster corresponding to the fore wheel and the fixed type is used for the caster corresponding to the rear wheel, the safe travel is secured while moving forward. However, when the cart is moving backward in that configuration, the caster corresponding to the fore wheel becomes the fixed type and the caster corresponding to the rear wheel becomes the swivel type. In this case, the change of the direction is accomplished by the rotation of the rear wheel, and the safe travel is not secured. Thus, for safe travel, the user needs to turn the cart around so that the rotary caster is always positioned at the position of the fore wheel. Of course, if the space around the working place is sufficiently large so that the cart can be turned around and travelled, then there will not be significant problems. However, if it is difficult to turn the cart around, there can be problems in the travel.

Therefore, a caster which can be converted into the fixed type and the swivel type was developed. The typical one for this caster is the Korea published laid-open utility 20-1998-053584.

Referring to this publication, it consists of a swivel plate and a fixed plate and has a fixing bolt, so that it can be used as the fixed type or swivel type caster by coupling or separating the fixing bolt if necessary. After installing this caster to the cart, when moving forward, the fixing bolt is separated from the caster corresponding to the fore wheel so as to construct the swivel type and the fixing bolt is coupled to the caster corresponding to the rear wheel so as to construct the fixed type, and when moving backward, to the contrary, the fixing bolt is separated from the caster corresponding to the rear wheel and the fixing bolt is coupled to the caster corresponding to the fore wheel, then the safe travel will be possible. However, there is a disadvantage that such operation should be manually carried out by the operator so that great inconveniences occur.

SUMMARY OF THE DISCLOSURE

The present invention has been made in an effort to solve the above-described problems and an object of the present invention is to provide a cart caster which can be automatically converted into a fixed caster or rotating caster according to the forward/backward movement of the cart so as to ensure safe travel in order to easily carry a product and improve work conditions.

The present invention to accomplish the above mentioned object comprises: a fixing plate configured to be fixedly installed at a bottom surface of the cart, wherein a coupling section is formed at a middle of a bottom surface of the fixing plate and a coupling recess is formed at one side of the coupling section; a bracket having a coupling shaft configured to rotationally couple to the coupling section formed at the fixing plate, the coupling shaft being formed at an upper surface thereof, and having an inserting hole positioned at the same vertical line as the coupling recess, the inserting hole being formed at one side thereof; a wheel eccentrically mounted to a lower side of inside of the bracket so as to perform a rolling motion; and a swiveling conversion unit comprising: a swiveling plate installed at an upper side of the inside of the bracket with a rotating shaft so as to be able to perform a seesaw motion; a fixing pin installed at one end side of the swiveling plate and configured to be inserted in the coupling recess of the fixing plate by upwardly penetrating the inserting hole of the bracket so as to restrain a swivel of the fixing plate and the bracket; and a rotating member installed at an other end side of the swiveling plate, wherein the rotating member is raised or lowered according to a rotation direction of the wheel by being closely contacted to the wheel so as to lower or raise the fixing pin installed at the one end side so that the fixing pin is separated from the coupling recess of the fixing plate so as to make the bracket to be able to swivel or the fixing pin is coupled to the coupling recess so as to make the bracket to be fixed.

Preferably, the rotating member comprises: a support plate coupled to the other end side of the swiveling plate with a hinge shaft so as to be rotatable, wherein a slot is formed at one side of the support plate and an auxiliary wheel is installed at lower end of the support plate with a one-way bearing so as to be rotated in only one direction according to the rotation direction of the wheel by being closely contacted to the outer surface of the wheel, a support pin coupled to one side of the swiveling plate and coupled to the slot of the support plate so as to limit the rotation radius of the support plate, and an elastic member installed at the swiveling plate to provide an elastic force so as to lower downwardly the support plate so that the auxiliary wheel provided at the lower end of the support plate is closely contacted to the wheel.

According to the present invention, since the cart caster is automatically converted into a fixed or rotating caster by an operation of a swiveling conversion unit including an auxiliary wheel that is closely contacted to a wheel according to the forward/backward movement of the cart so as to rotate in only one direction and a fixing pin inserted into a coupling hole of a fixing plate, the present invention has an effect that safe travel may be ensured in order to easily carry a product and improve work conditions.

DETAILED DESCRIPTION

The cart caster according to the present invention will be described below in detail with reference to the accompanying drawings.

Before describing, it should be mentioned that the terminologies or the words used in the present specification and the claims should not be interpreted by limiting to the usual or dictionary-defined meanings but should be interpreted according to the meanings and the concepts appropriate to the technical thoughts of the present invention based on the principle that the inventor can appropriately define the concept of terminologies to best describe his invention.

Therefore, it should be understood that since an embodiment described in the present specification and the structures shown in the drawings are only the most preferred embodiment of the present invention and do not represent all technical thoughts of the present invention, there can be various equivalents and changes which can substitute the technical thoughts at the time of the present application.

Figure 1:
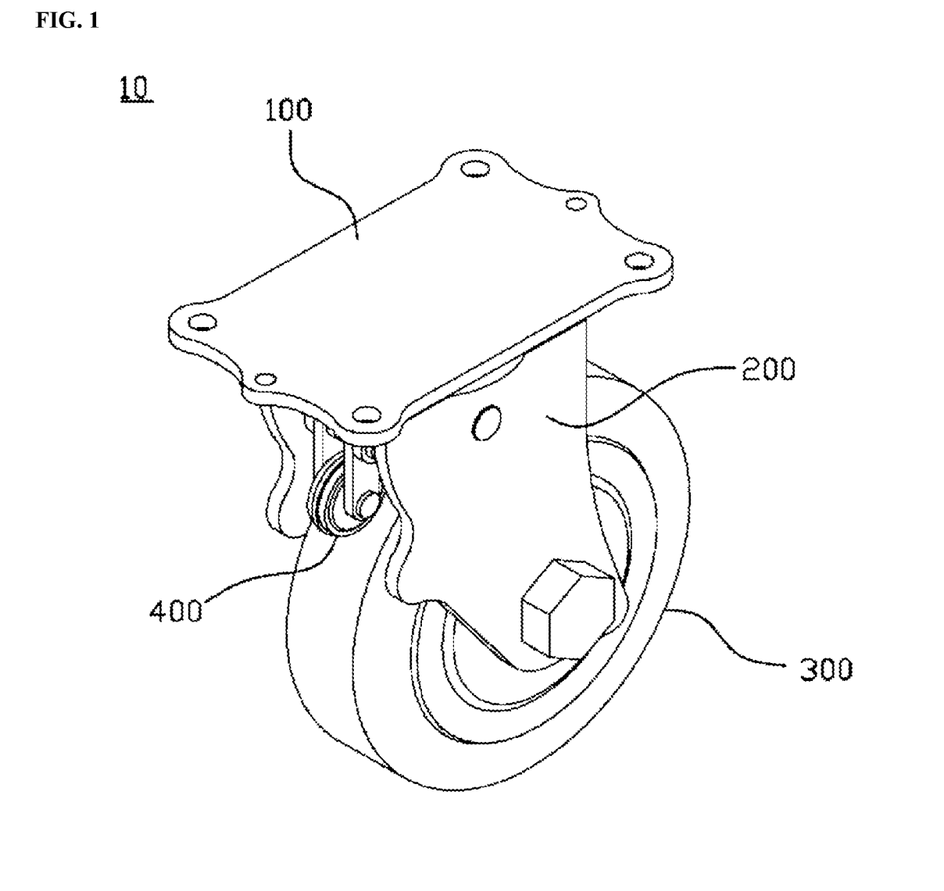
FIG. 1 is a perspective view of a cart caster according to a preferred embodiment of the present invention.
Figure 2:
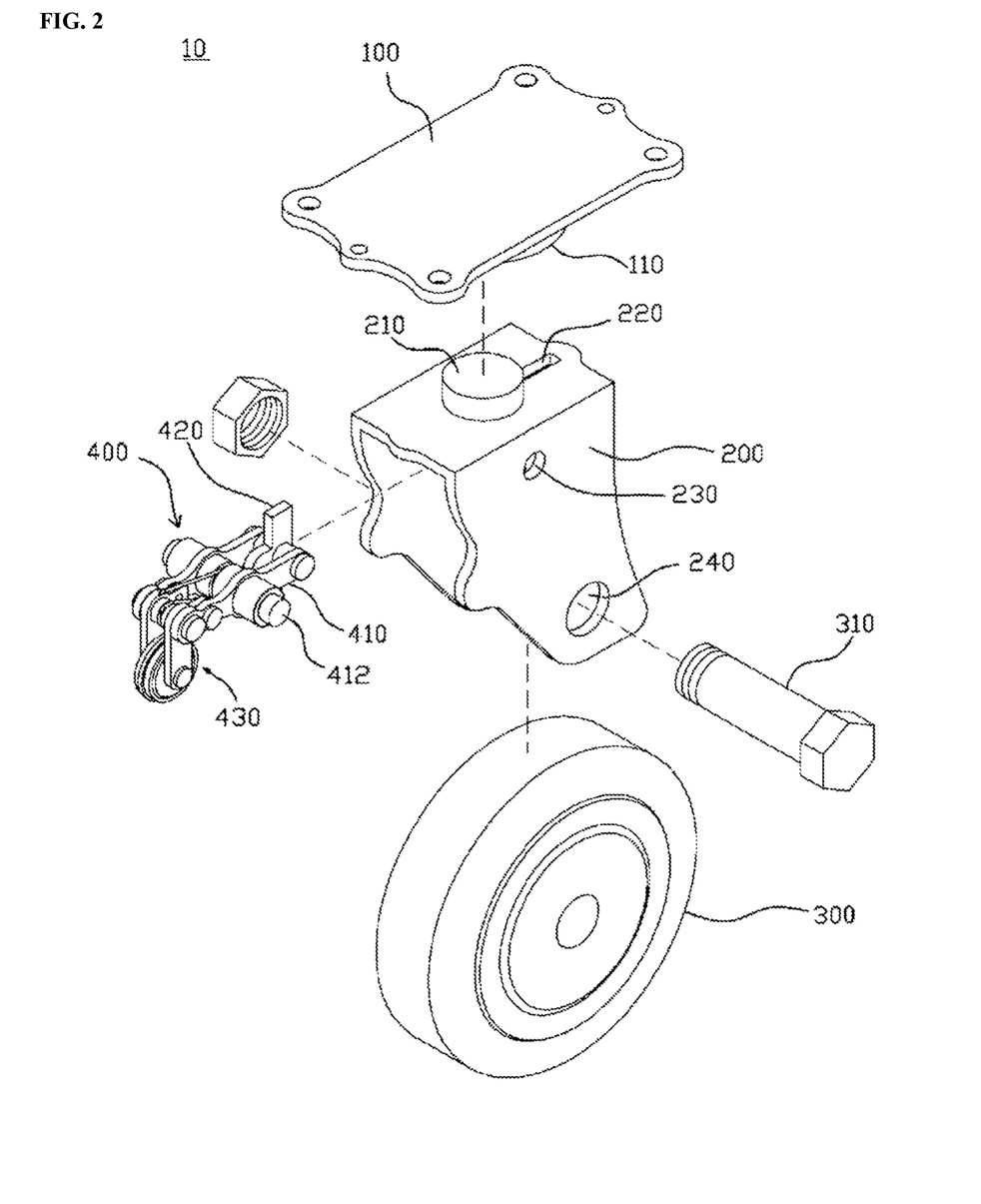
FIG. 2 is an exploded perspective view of the cart caster according to a preferred embodiment of the present invention.
Figure 3:
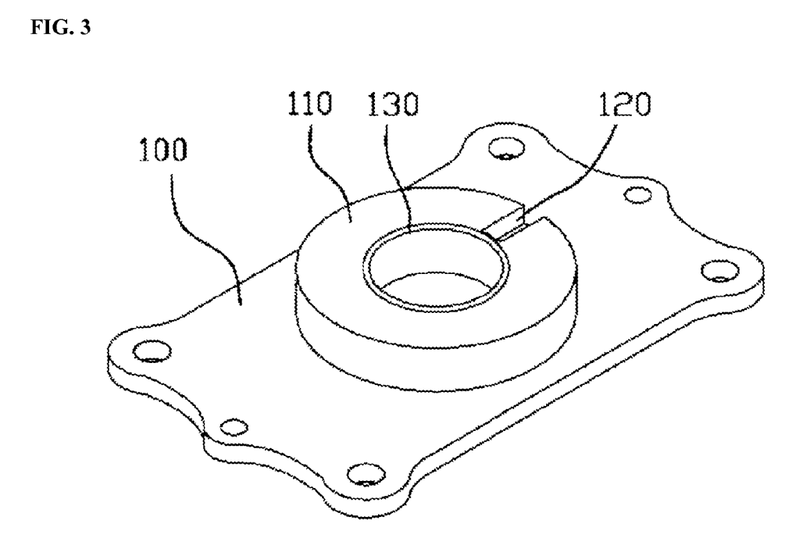
FIG. 3 is a perspective view showing a fixing plate according to a preferred embodiment of the present invention turned upside down.

FIG. 1 is a perspective view of a cart caster according to a preferred embodiment of the present invention, FIG. 2 is an exploded perspective view of the cart caster according to a preferred embodiment of the present invention, and FIG. 3 is a perspective view showing a fixing plate according to a preferred embodiment of the present invention turned upside down.

Referring to FIGS. 1 and 2, the cart caster 10 of the present invention includes a fixing plate 100, a bracket 200, a wheel 300, and a swiveling conversion unit 400.

First, the fixing plate 100 is fixedly installed at a lower surface, that is, a bottom surface of the cart and is formed in a form of sheet as shown in FIG. 3, and a coupling section 110 is formed at the middle of the bottom surface thereof and a coupling recess 120 is formed at one side of the coupling section 110. Of course, bolt holes and the like not denoted with reference number are formed at edge portion of the fixing plate 100 for coupling to the cart. In addition, a bearing 130 is provided at inner circumference surface of the coupling section 110 for smooth rotation when it is coupled to a coupling shaft 210 of the bracket 200 which will be described later.

Next, the bracket 200 has a shape opened forward/backward and to lower side, and the coupling shaft 210 configured to rotationally couple to the coupling section 110 formed at the fixing plate 100 is formed at an upper surface of the bracket, and an inserting hole 220 is formed at one side, and the inserting hole 220 is formed to be positioned at the same vertical line as the coupling recess 120 formed at the fixing plate 100. In addition, first and second penetration holes 230, 240 are formed at a lower side and an upper side of both side walls of the bracket 200, and the second penetration hole 240 is not formed at an identical vertical line as the first penetration hole 230 but eccentrically formed.

Next, the wheel 300 is eccentrically mounted to a lower side of inside of the bracket 200 using a support shaft 310 inserted to the second penetration hole 240 so as to perform a rolling motion, and is a kind of wheel being widely used.

Finally, the swiveling conversion unit 400 is installed to be positioned at an upper side of the inside of the bracket 200, that is, the upper side of the wheel 300 mounted at the bracket 200, so as to be automatically operated to come into a condition in which the bracket 200 and the fixing plate 100 swivel or come into a condition in which they are fixed according to the rotation direction of the wheel 300, wherein the swiveling conversion unit comprises a swiveling plate 410 installed at the bracket 200 with a rotating shaft 412 coupled to the first penetration hole 230 of the bracket 200 so as to be able to perform a seesaw motion, a fixing pin 420 installed at one end side of the swiveling plate 410, and a rotating member 430 installed at the other end side of the swiveling plate 410. A detailed structure and operation relation of the swiveling conversion unit 400 will be reviewed again below.

Figure 4A:
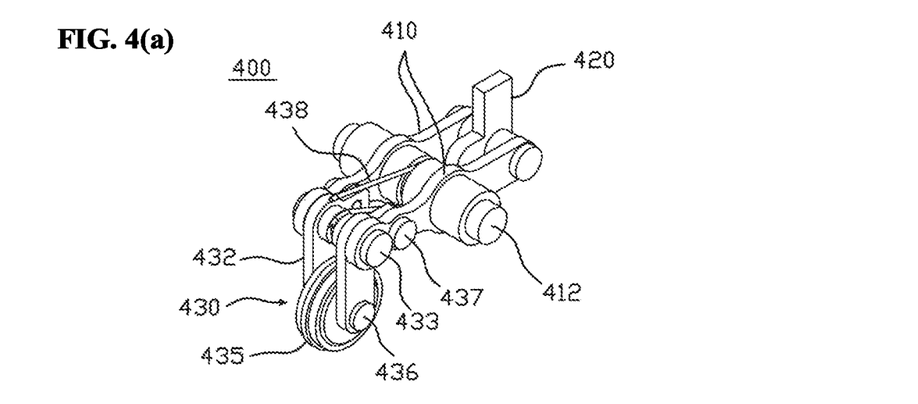
FIG. 4(a) is an enlarged perspective view of the cart caster according to a preferred embodiment of the present invention.
Figure 4B:
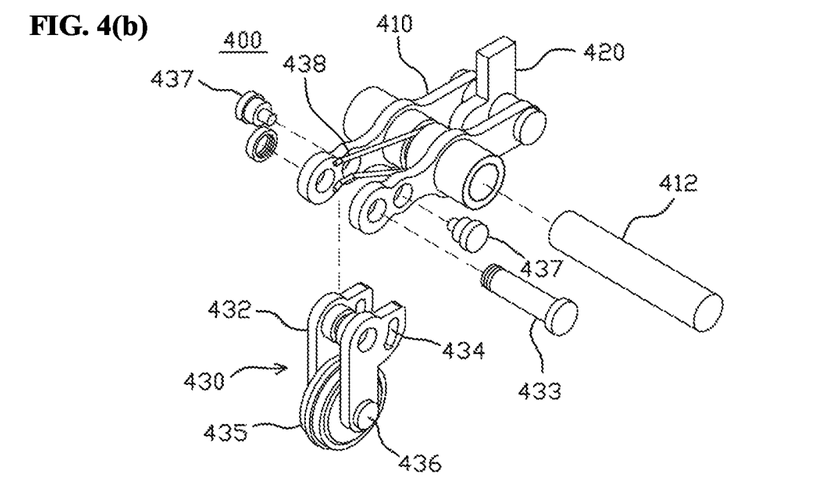
FIG. 4(b) is a partly exploded perspective view.
Figure 4C:
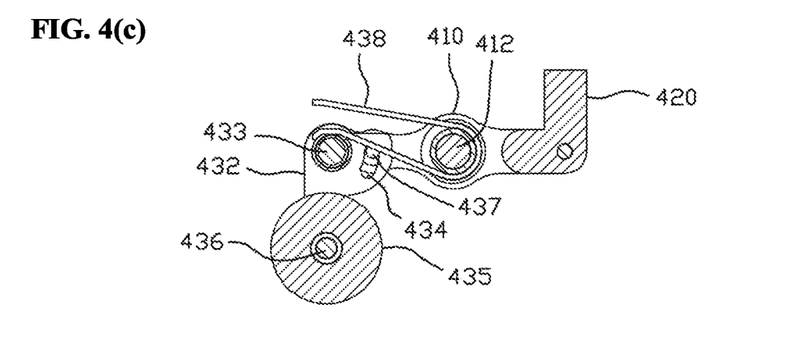
FIG. 4(c) is a sectional view along a line A-A of (a) showing coupling relation.

FIG. 4(a) is an enlarged perspective view of the cart caster according to a preferred embodiment of the present invention, FIG. 4(b) is a partly exploded perspective view, and FIG. 4(c) is a sectional view along a line A-A of (a) showing coupling relation.

Referring to the drawings, the swiveling conversion unit 400 comprises the swiveling plate 410, the fixing pin 420 and the rotating member 430 as reviewed above.

First, the swiveling plate 410 is mounted at the first penetration hole 230 of the bracket 200 not shown in these drawings with the rotating shaft 412 so as to be able to perform the seesaw motion.

Next, the fixing pin 420 is installed at one end side, that is, rear end of the swiveling plate 410 so as to be protruded upward, and is configured to be inserted into the coupling recess 120 of the fixing plate 100 by being protruded upward through the inserting hole 220 of the bracket 200 not shown in these drawings. The coupling relation thereof will be reviewed below.

Next, the rotating member 430 is installed at the other end side, that is, forward end of the swiveling plate 410 and comprises a support plate 432, a support pin 437 and an elastic member 438, wherein a support plate 432 is coupled to the other end side of the swiveling plate 410 with a hinge shaft 433 so as to be rotatable, and a slot 434 is formed at one side of the support plate, and an auxiliary wheel 435 is installed at lower end of the support plate with a one-way bearing so as to be rotated in only one direction according to the rotation direction of the wheel 300 by being closely contacted to the outer surface of the wheel 300 not shown in these drawings, wherein the support pin 437 is coupled to one side of the swiveling plate 410 and is coupled to the slot 434 of the support plate 432 so as to limit the rotation radius of the support plate 432, and wherein one end of the elastic member 438 is installed at one side of the swiveling plate 410 and its other end is extended to the support plate 432 and provides an elastic force so as to lower downwardly the support plate 432 so that the auxiliary wheel 435 provided at the lower end of the support plate is closely contacted to the wheel 300 not shown in these drawings and to push upwardly the fixing pin 420 positioned at the opposite side.

The one-way bearing 436 for mounting the auxiliary wheel 435 is also referred to as a one-way clutch and is constructed to rotate in only one direction, clockwise or counterclockwise. The one-way bearing is being widely used and the description thereof will be omitted.

The support pin 432 is inserted into the slot 434 formed at the support plate 432, and is to limit the rotation range of the support plate 432 rotationally coupled with the hinge shaft 433. The support plate 432 can rotate clockwise or counterclockwise with the hinge shaft 433 as a center of rotation.

The cart caster of the present invention is configured and operated as follows.

Figure 5:
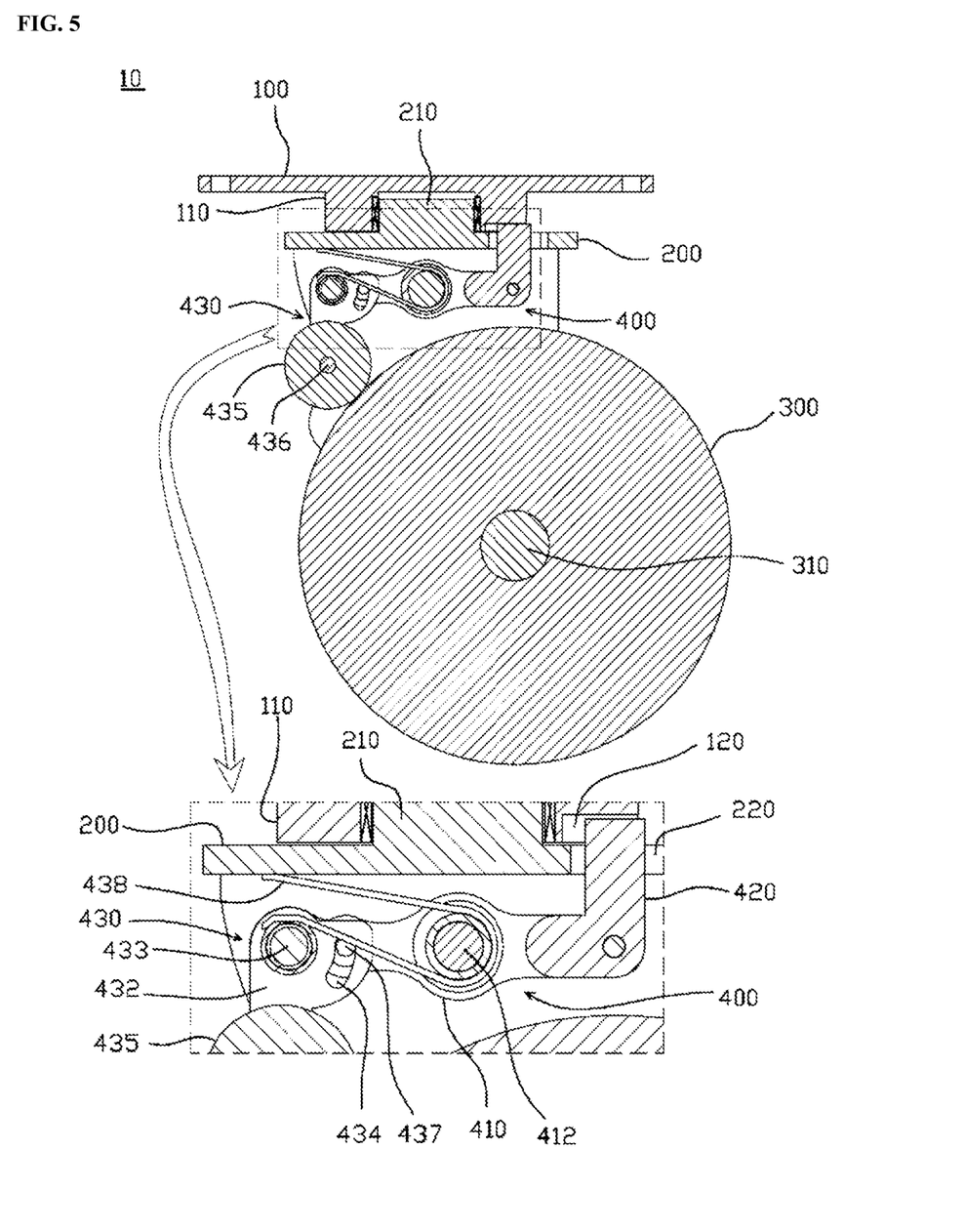
FIG. 5 is a sectional view along a line B-B of FIG. 1 showing coupling relation of the fixed and rotating caster according to a preferred embodiment of the present invention.
Figure 6A:
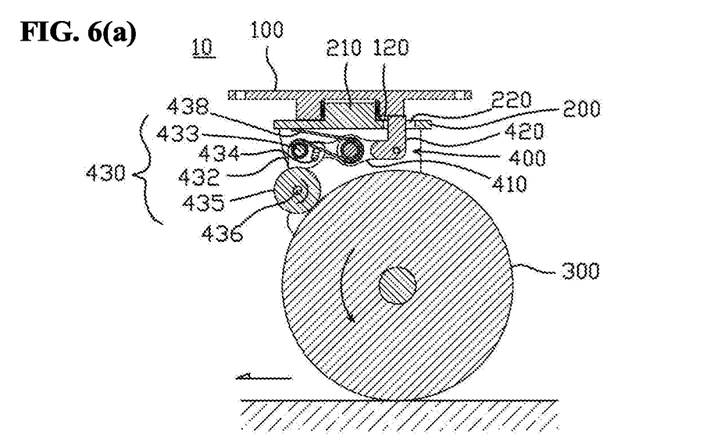
FIGS. 6(a) to 6(c) are perspective views showing operation relations of the cart caster according to a preferred embodiment of the present invention.
Figure 6B:
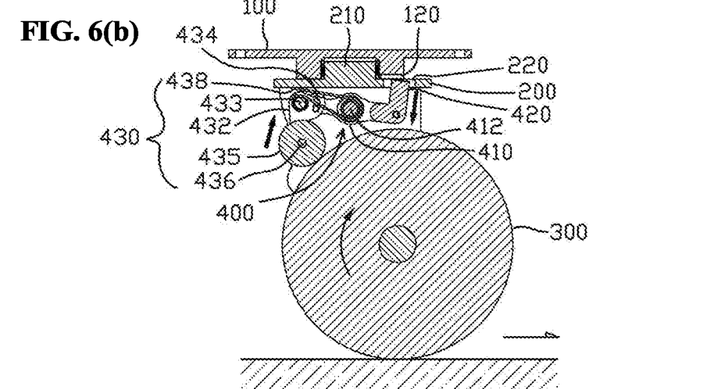
Figure 6C:
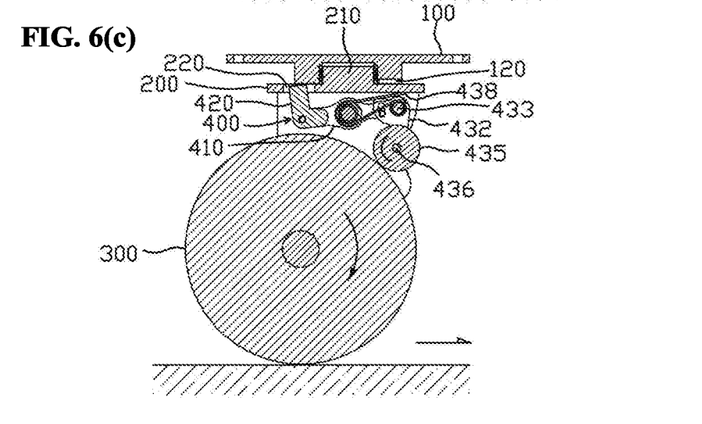

FIG. 5 is a sectional view along a line B-B of FIG. 1 showing coupling relation of the cart caster according to a preferred embodiment of the present invention, and FIGS. 6(a) to 6(c) are perspective views showing operation relations of the cart caster according to a preferred embodiment of the present invention.

First, referring to FIG. 5, the coupling shaft 210 of the bracket 200 is inserted and coupled to the coupling section 110 formed at the bottom surface of the fixing plate 100, and the wheel 300 is eccentrically mounted below the bracket 200 via the support shaft 310. The inserting hole 220 formed at one side of the bracket 200 and the coupling recess 120 formed at one side of the bottom side of the fixing plate 100 are positioned at a same vertical line. In addition, the swiveling conversion unit 400 is installed at inner upper side of the bracket 200. That is, the swiveling plate 410 of the swiveling conversion unit 400 is coupled to the bracket 200 with the rotating shaft 412 so as to be able to perform a seesaw motion, and the fixing pin 420 installed at one end side of the swiveling plate 410 upwardly penetrates the inserting hole 220 of the bracket 200 and is inserted into the coupling recess 120. The fixing plate 100 and the bracket 200 cannot swivel in this condition.

The swiveling member 430 is installed at the other end side of the swiveling plate 410. That is, the supporting plate 432 of the rotating member 430 is rotationally coupled to the swiveling plate 410 with the hinge shaft 433. However, the rotation range of the supporting plate 432 is restricted by the supporting pin 437 coupled to the slot 434 formed at one side. The auxiliary wheel 435 is mounted at the bottom part of the supporting plate 432, and is installed with the one-way bearing 436 so as to be rotatable in only one direction. For example, the auxiliary wheel 435 is constructed to be able to rotate clockwise but not able to rotate counterclockwise.

In addition, the elastic member 438 provided at one side of the swiveling plate 410 is mounted so as to provide the elastic force on the upper side of the supporting plate 432 mounted with the auxiliary wheel 435 so that the auxiliary wheel 435 is always closely contacted to the wheel 300.

The caster of the present invention is operated as in FIG. 6.

That is, as shown in FIG. 6(a), when the fixing plate 100 is advanced in the arrow direction while the wheel 300 is abutted against the ground, the wheel 300 is rotated counterclockwise and starts rolling motion. In addition, as described before, the auxiliary wheel 435 of the rotating member 430 closely contacted to the wheel 300 rotates clockwise while maintaining a condition of being able to rotate clockwise and being closely contacted to the wheel 300. In this condition, the caster becomes a fixed type which cannot be swiveled because the bracket 200 is connected to the fixing plate 100 with the fixing pin 420.

As shown in FIG. 6(b), when the caster 10 which was advancing is moved backward in the arrow direction, the wheel 300 is rotated clockwise, and the auxiliary wheel 435 closely attached contacted to this wheel should be rotated counterclockwise.—But, it cannot be rotated counterclockwise due to the one-way bearing 436. Although the auxiliary wheel 435 cannot be rotated, since it is closely contacted to the rotating wheel 300 due to the elastic member 438 and the supporting plate 432 mounted with the auxiliary wheel 435 is rotationally provided to the swiveling plate 410 with the hinge shaft 433, the supporting plate 432 is rotated counterclockwise with the hinge shaft 433 as the center of rotation due to the friction of the auxiliary wheel 435 and gradually rises. Due to this rising of the supporting plate 432, the swiveling plate 410 is rotated clockwise around the rotating shaft 412 so as to make the fixing pin 420 to be lowered and separated from the coupling recess 120 of the fixing plate 100. Since the slot 434 is formed at the supporting plate 432 and the supporting pin 437 is inserted into this slot 434, the rotation range of the supporting plate 432 is limited to the length of the slot 434 and the length of the slot 434 is formed to such an extent that the fixing pin 420 installed at the swiveling plate 410 can be separated from the coupling recess 120 of the fixing plate 100.

In this way, when the fixing pin 420 is separated from the coupling recess 120 of the fixing plate 100, the bracket 200 becomes a swivel type. In this condition, if further traveled as shown in FIG. 6(c), the wheel 300 eccentrically mounted to the bracket 200 is rotated together with the bracket 200 and the auxiliary wheel 435 is positioned at the fore end in the direction of travel. If the change of direction is accomplished in this way, the fixing pin 420 is positioned at the side opposite to coupling recess 120 formed at the fixing plate 100. That is, since the fixing pin 420 cannot connect the bracket 200 and the fixing plate 100 but abuts the bottom surface of the fixing plate 100, it provides the swivel caster in which the bracket 200 swivels. In addition, the auxiliary wheel 435 closely contacted to the wheel 300 due to the change of the direction of the bracket 200 is rotated counterclockwise which is opposite direction to the initially shown in FIG. 6(a).

If the fixing plate 100 of the caster is moved again in the advancing direction as in FIG. 6(a), the change of the direction is accomplished to the condition of FIG. 6(a) due to the wheel 300 eccentrically mounted to the bracket 200 and the auxiliary wheel 435 which was raised due to the elastic member 438 is also lowered to make the fixing pin 420 provided at the other end side to be raised and inserted in the coupling recess 120 of the fixing plate 100.

As described above, it can be seen that the caster 10 of the present invention can be automatically converted from the fixed type to the swivel type according to the direction of travel of the wheel 300, and such caster is installed to the cart as follows.

Figure 7A:
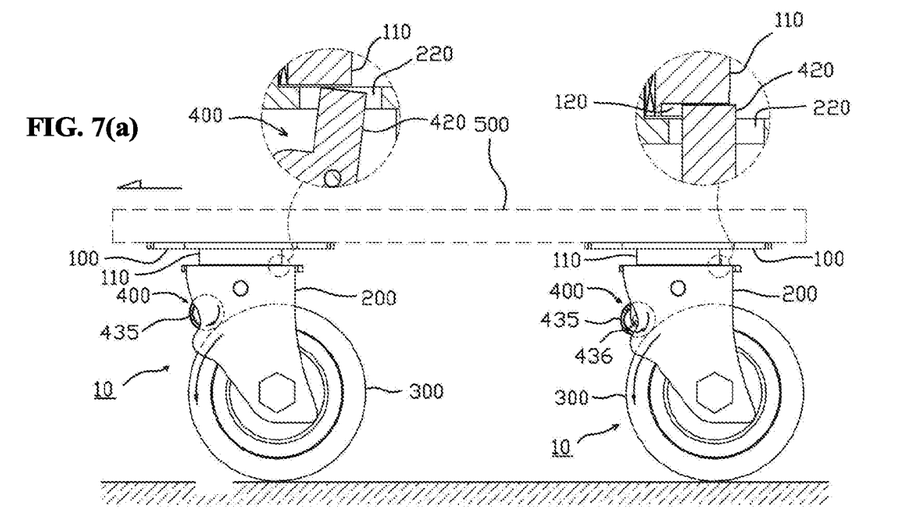
FIGS. 7(a) and 7(b) are schematic side views showing conditions of use of the cart caster according to a preferred embodiment of the present invention.
Figure 7B:
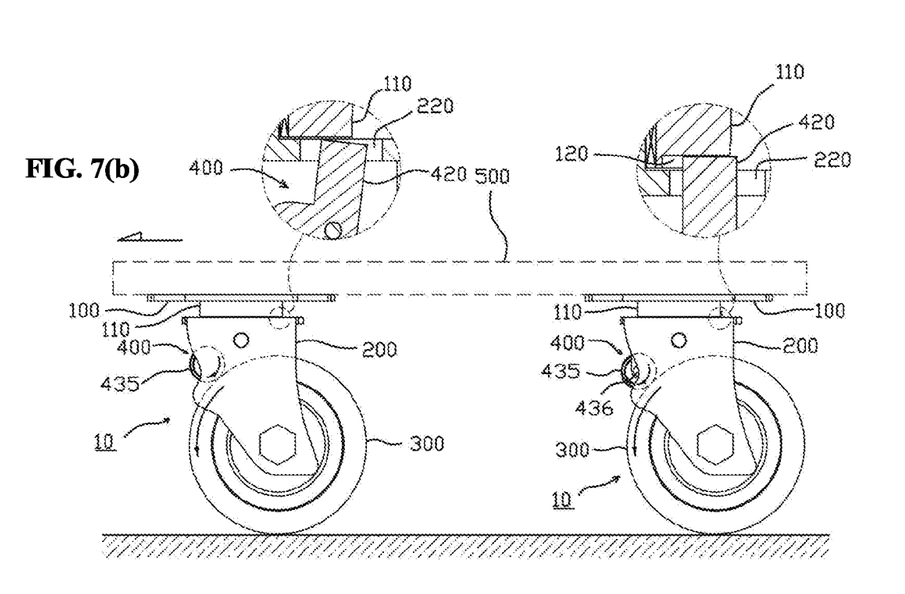

FIGS. 7(a) and 7(b) are schematic side views showing conditions of use of the cart caster according to a preferred embodiment of the present invention.

First, referring to FIG. 7(a), the caster 10 of the present invention is installed at the bottom surface of the cart 500 with the fixing plate 100 so as to construct the fore wheel and the rear wheel. When the caster 10 corresponding to the fore wheel is attached, the caster 10 is attached in the condition in which the fixing pin 420 of the swiveling conversion unit 400 upwardly protruded through the bracket 200 is not inserted into the coupling recess 120 by rotating the fixing plate 100 and by making the coupling recess 120 formed at the fixing plate 100 to be positioned at the front side, and when the caster 10 corresponding to the rear wheel is attached, it is attached under the condition in which the fixing pin 420 is inserted into the coupling recess 120 of the fixing plate 100. That is, when the casters 10 are attached for the first time, the caster 10 corresponding to the fore wheel is attached in a swivel type, and the caster 10 corresponding to the rear wheel is attached in a fixed type.

In this condition, if the cart 500 is moved forward in the arrow direction, the wheels 300 corresponding to the fore wheel and the rear wheel are rotated counterclockwise so as to move the cart 500. Since the auxiliary wheel 435 of the swiveling conversion unit 400 closely contacted to this wheel 300 is rotated clockwise while being closely contacted as reviewed above and the fixing pin 420 of the caster 10 corresponding to the fore wheel is separated from the coupling recess 120 of the fixing plate 100. The bracket 200 and the fixing plate 100 are moved by the rolling motion of the wheel 300 in a swivel type in which the change of direction can be made easily. To the contrary, since the fixing pin 420 of the caster 10 corresponding to the rear wheel is inserted into the coupling recess 120 of the fixing plate 100, the bracket 200 and the wheel 300 are moved by the rolling motion of the wheel 300 while being fixed.

In that condition, if the cart 500 is moved rearward as in FIG. 7(b), since the caster 10 corresponding to the fore wheel is swivel type, it is naturally converted in its direction due to the wheel 300 eccentrically mounted, and the fixing pin 420 is inserted into the coupling recess 120 formed at the fixing plate 100 so as to be automatically changed to fixed type. To the contrary, in case of the caster 10 corresponding to the rear wheel, the auxiliary wheel 435 closely contacted due to the change of the rotation direction of the wheel 300 under the fixed type condition is raised by the frictional force so as to separate the fixing pin 420 from the coupling recess 120 of the fixing plate 100, and the bracket 200 is converted in its direction due to the eccentrically mounted wheel 300 so that the fixing pin 420 is positioned at the side opposite to the coupling recess 120 and is automatically changed to the swivel type. That is, if the cart 500 is moved rearward, the rear wheel acts as the fore wheel and the fore wheel acts as the rear wheel.

As described above, in the caster 10 of the present invention attached at the bottom side of the cart 500, since the caster 10 positioned at the front side of the travel direction is automatically converted to the swivel type and the caster 10 positioned at the rear side of the travel direction is automatically converted to the fixed type according to the travel direction of the cart 500, the safety of the transportation at the time of forward/backward motion of the cart 500 is secured. In addition, the convenience of the use is considerably improved since the conversion to the fixed type and the swivel type is automatically accomplished.

In the meantime, since the cart 500 is widely known, it is briefly shown. However, it should be appreciated that it includes all carts for transporting articles such as the unmanned carrier, manned cart, etc.

The above content has described the characteristics and the technical advantages of the present invention more or less widely to help understand the claims of the present invention well. It should be appreciated by those skilled in the art that the described concepts and particular embodiments of the present invention can be immediately used as a basis for a design of other structures or a change to carry out objects similar to that of the present invention.

In addition, it should be appreciated by those skilled in the art that the described concepts and embodiments of the present invention can be a basis for amending to or designing other structure to carry out same objects as the present invention, and such amendments and the changed equivalent structure made by those skilled in the art can have various alternatives, substitutions and modifications within the spirit and scope of the invention as defined by the appended claims.

What is claimed is:

1. A cart caster comprising:
   a fixing plate configured to be fixedly installed at a bottom surface of a cart, wherein a coupling section is formed at a middle of a bottom surface of the fixing plate and a coupling recess is formed at one side of the coupling section;
   a bracket having a coupling shaft configured to rotationally couple to the coupling section formed at the fixing plate, the coupling shaft being formed at an upper surface thereof, and having an inserting hole positioned at a same vertical line as the coupling recess, the inserting hole being formed at one side thereof;
   a wheel eccentrically mounted to a lower side of inside of the bracket so as to perform a rolling motion; and
   a swiveling conversion unit comprising:
   a swiveling plate installed at an upper side of the inside of the bracket with a rotating shaft so as to be able to perform a seesaw motion;
   a fixing pin installed at one end side of the swiveling plate and configured to be inserted in the coupling recess of the fixing plate by upwardly penetrating the inserting hole of the bracket so as to restrain a swivel of the fixing plate and the bracket; and
   a rotating member installed at an other end side of the swiveling plate, wherein the rotating member is raised or lowered according to a rotation direction of the wheel by being closely contacted to the wheel so as to lower or raise the fixing pin installed at the one end side so that the fixing pin is separated from the coupling recess of the fixing plate so as to make the bracket to be able to swivel or the fixing pin is coupled to the coupling recess so as to make the bracket to be fixed.

2. The cart caster of claim 1, wherein the rotating member comprises:
   a support plate configured to couple to the other end side of the swiveling plate with a hinge shaft so as to be rotatable, wherein a slot is formed at one side of the support plate and an auxiliary wheel is installed at lower end of the support plate via with a one-way bearing so as to be rotated in only one direction according to the rotation direction of the wheel by being closely contacted to the outer surface of the wheel, a support pin coupled to one side of the swiveling plate and coupled to the slot of the support plate so as to limit the rotation range of the support plate, and
an elastic member installed at the swiveling plate to provide an elastic force so as to lower downwardly the support plate so that the auxiliary wheel provided at the lower end of the support plate is closely contacted to the wheel.

\* \* \* \* \*